(12) United States Patent
Wang et al.

(10) Patent No.: US 6,332,791 B1
(45) Date of Patent: Dec. 25, 2001

(54) CARD CONNECTOR WITH CARD-EJECTING DEVICE

(75) Inventors: Leland Wang, Taipei; Wen-Yen Liu, Taoyuan Hsien; Chan-Ming Hsu, Chung-Li; Fang-Ping Wang, Hsinchu; Shun-Jung Chuang, Ping-Chen, all of (TW)

(73) Assignee: FCI Taiwan Limited, Taoyuan Hsien (TW)

( * ) Notice: Subject to any disclaimer, the term of this patent is extended or adjusted under 35 U.S.C. 154(b) by 0 days.

(21) Appl. No.: 09/811,409

(22) Filed: Mar. 20, 2001

(30) Foreign Application Priority Data

Sep. 29, 2000 (TW) ............................................ 089216937

(51) Int. Cl.⁷ .................................................. H01R 13/62
(52) U.S. Cl. ............................................................ 439/159
(58) Field of Search .................................. 439/159, 152, 439/153, 155, 157, 160, 64

(56) References Cited

U.S. PATENT DOCUMENTS

| | | | |
|---|---|---|---|
| 5,536,180 | * 7/1996 | Ishida et al. | 439/159 |
| 5,846,096 | * 12/1998 | Ishida | 439/159 |
| 5,984,702 | * 11/1999 | Nishioka | 439/159 |
| 6,036,513 | * 3/2000 | Nishioka | 439/159 |
| 6,042,401 | * 3/2000 | Oguchi et al. | 439/159 |
| 6,059,588 | * 5/2000 | Tung et al. | 439/159 |
| 6,071,135 | * 6/2000 | Obara | 439/159 |
| 6,095,835 | * 8/2000 | Oguchi | 439/159 |
| 6,113,403 | * 9/2000 | Oguchi | 439/159 |
| 6,123,560 | * 9/2000 | Hara et al. | 439/159 |

* cited by examiner

Primary Examiner—Tulsidas Patel
(74) Attorney, Agent, or Firm—Baker Botts L.L.P.

(57) ABSTRACT

A card connector includes a base plate with an accommodating groove, a card-ejecting device, and a retainer for retaining the card-ejecting device on the baseplate. The accommodating groove has an open front end and a closed rear end, and is adapted to receive a card therein. The card has a front end extending from the front end of the groove, and a rear end that is spaced apart from the rear end of the groove at a small distance. When the front end of the card is pressed inwardly to move the rear end of the card to the rear end of the groove, and is subsequently released, the card-ejecting device pushes the card outwardly relative to the connector. Accordingly, the card can be ejected with ease.

10 Claims, 7 Drawing Sheets

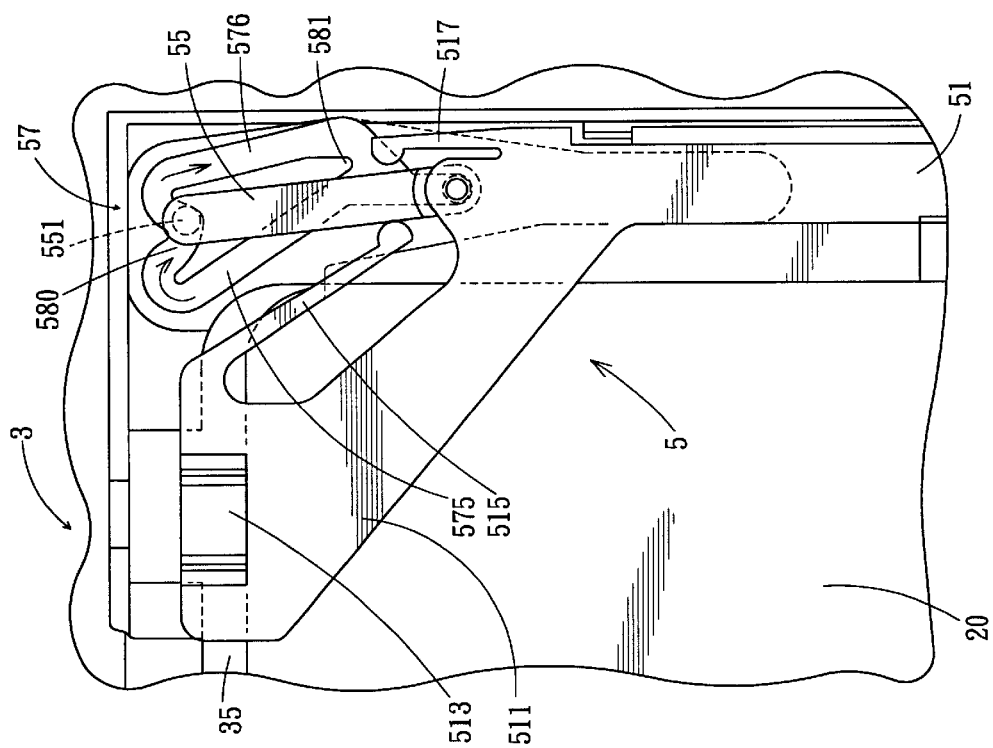
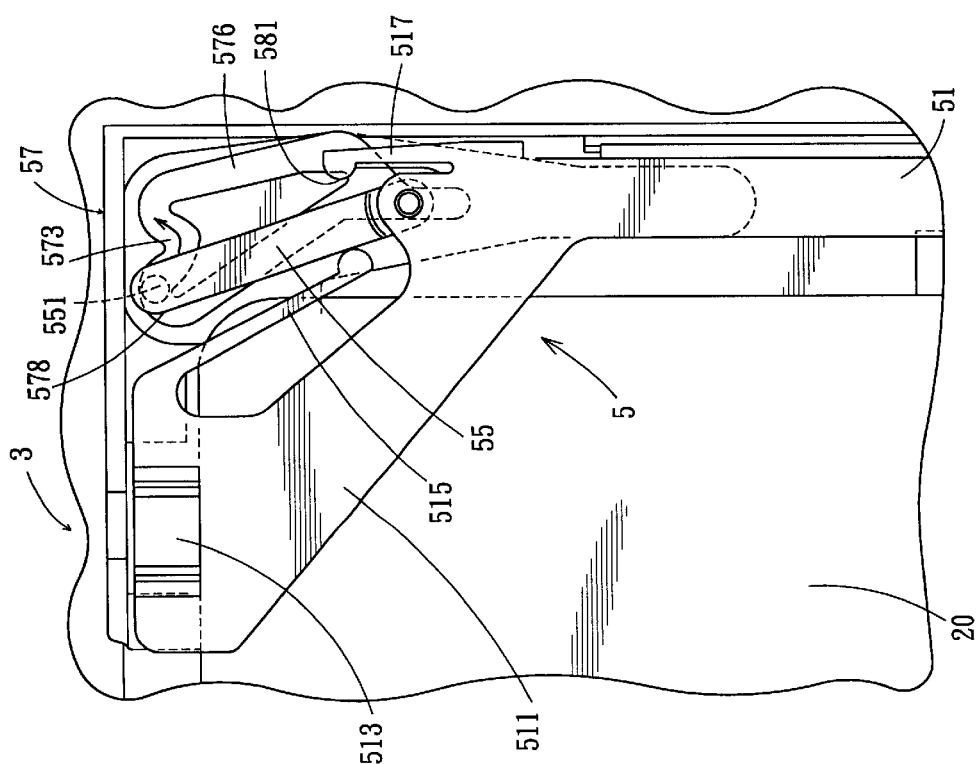

CARD CONNECTOR WITH CARD-EJECTING DEVICE

BACKGROUND OF THE INVENTION

1. Field of the Invention

This invention relates to a card connector, more particularly to a card connector, which is provided with a card-ejecting device.

2. Description of the Related Art

When it is desired to remove a smart card from an electrical connector, an ejecting rod (not shown) is inserted into the connector so as to push the smart card outwardly from the same, thereby resulting in inconvenience to the user.

SUMMARY OF THE INVENTION

An object of this invention is to provide a card connector with a card-ejecting device, which can push a card outwardly relative to the connector when the card is pressed inwardly to move a small distance within the connector and is subsequently released.

According to this invention, a card connector includes a base plate with an accommodating groove, a card-ejecting device, and a retainer for retaining the card-ejecting device on the base plate. The accommodating groove has an open front end and a closed rear end, and is adapted to receive a card therein. The card has a front end extending from the front end of the groove, and a rear end that is spaced apart from the rear end of the groove at a small distance. When the front end of the card is pressed inwardly to move the rear end of the card to the rear end of the groove, and is subsequently released, the card-ejecting device pushes the card outwardly relative to the connector. Accordingly, the card can be ejected with ease.

BRIEF DESCRIPTION OF THE DRAWINGS

These and other features and advantages of this invention will become apparent in the following detailed description of a preferred embodiment of this invention, with reference to the accompanying drawings, in which:

FIG. 6 is a schematic fragmentary view of the preferred embodiment, illustrating where the tongue is located in the guide slot when the card is pressed inwardly to its rear limit position in order to move the card from the extended position to the retracted position;

FIG. 7 is a schematic fragmentary view of the preferred embodiment, illustrating how the tongue is biased, upon release of the card, by a coiled tension spring from the position shown in FIG. 6 to a curved middle portion of a generally V-shaped rear slot portion of the guide slot so as to retain the card at the retracted position;

DETAILED DESCRIPTION OF THE PREFERRED EMBODIMENT

Figure 1:
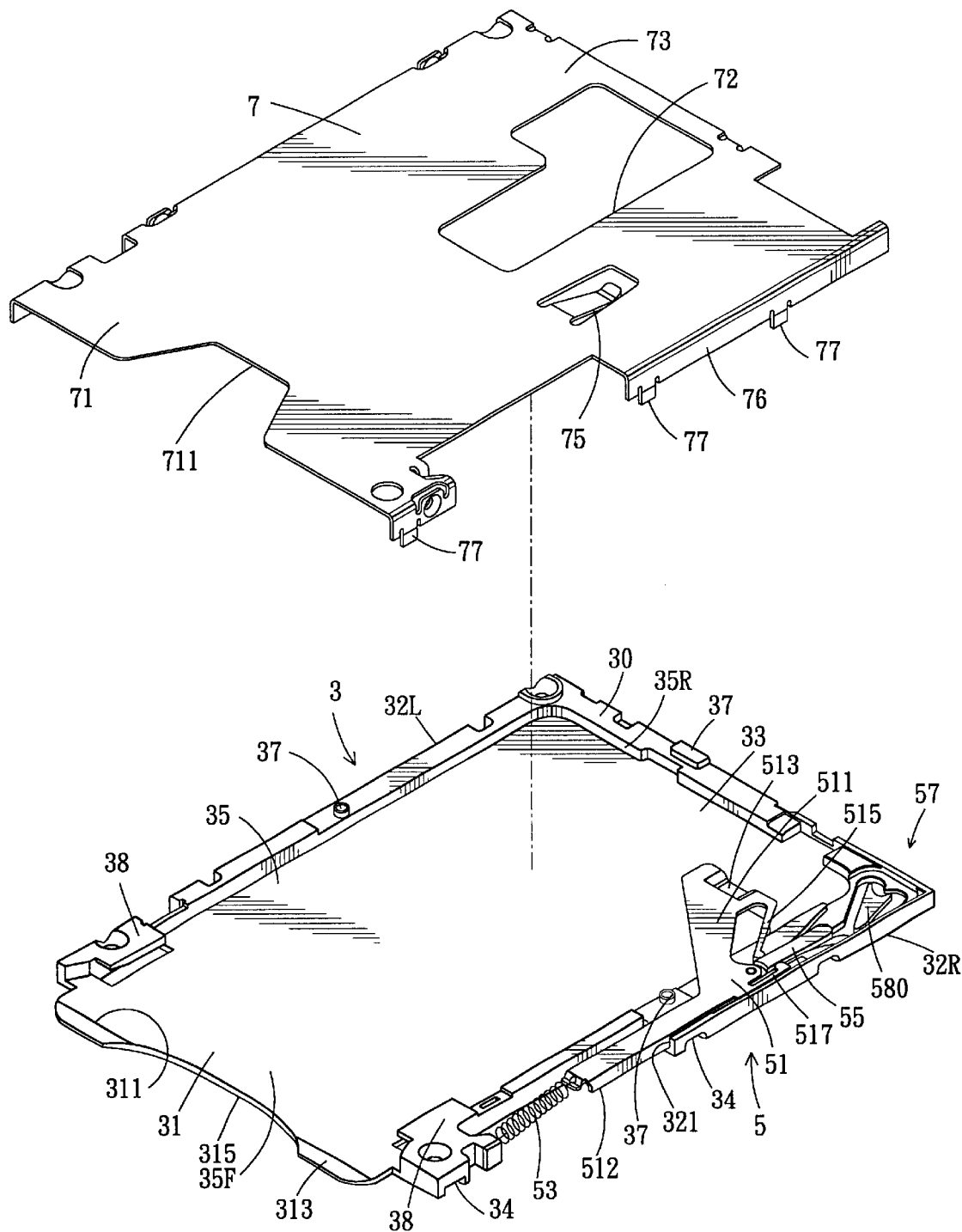
FIG. 1 is a partly exploded perspective view of the preferred embodiment of a card connector according to this invention.
Figure 2:
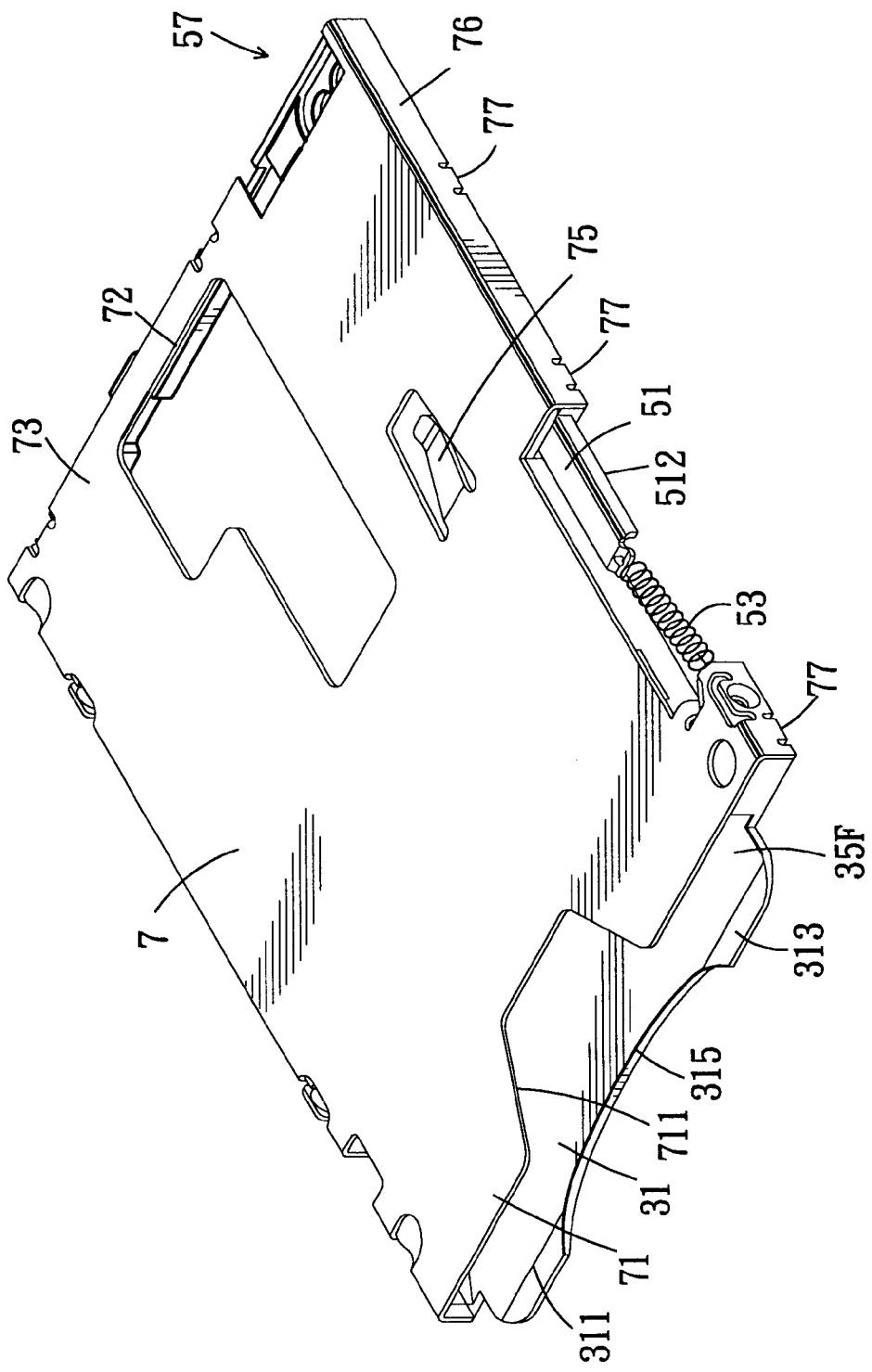
FIG. 2 is an assembled perspective view of the preferred embodiment.
Figure 3:
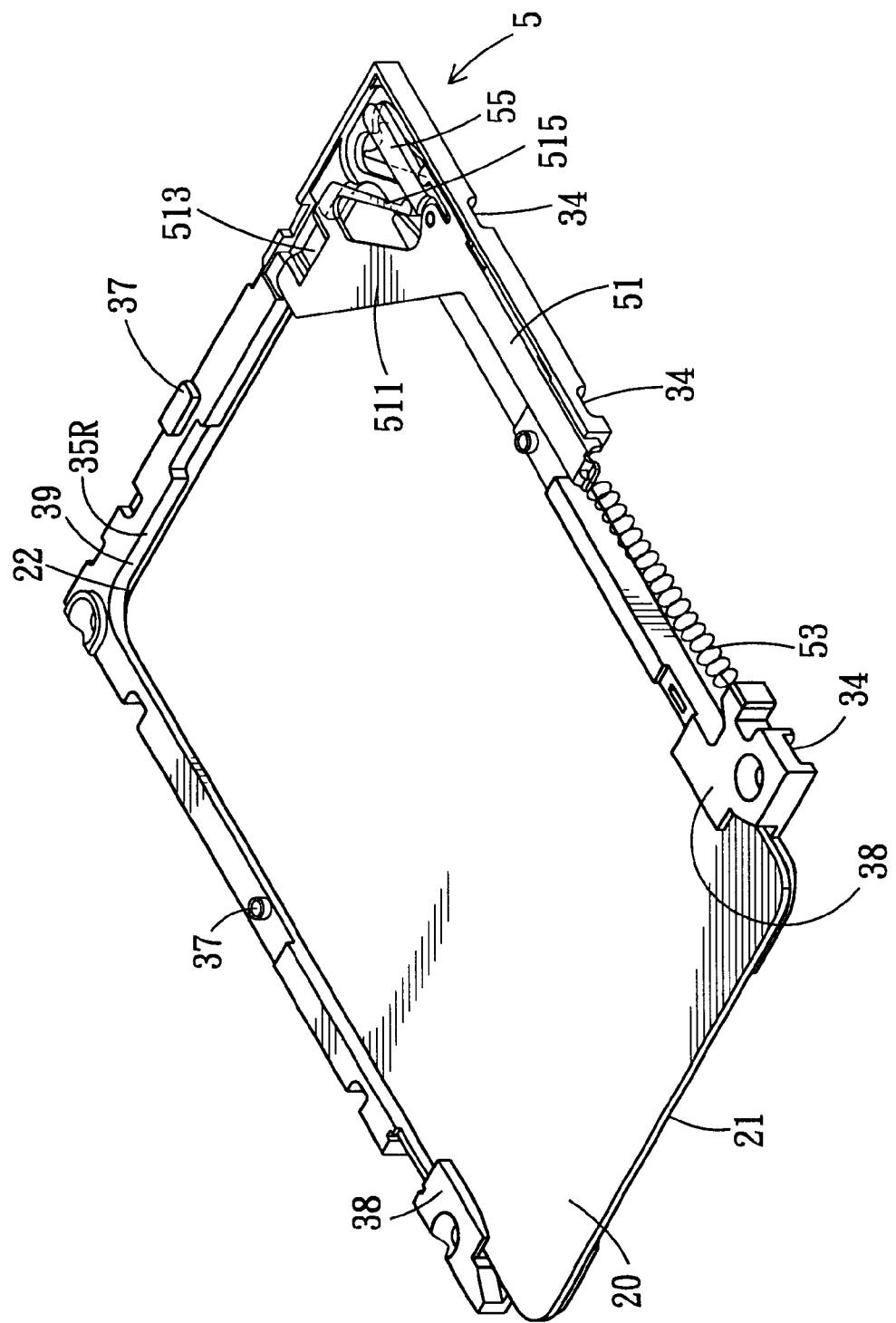
FIG. 3 is a perspective view of the preferred embodiment, illustrating how the card is disposed at a retracted position.

Referring to FIGS. 1, 2 and 3, the preferred embodiment of a card connector according to this invention is shown to include an elongated base plate 3, a card-ejecting device 5, and a retainer in the form of a cover plate 7. The connector is adapted for insertion of a card 20 therein.

The base plate 3 has a first side surface 30, a front end 31, a left side (32L), a right side (32R), a rear end 33, a plurality of retaining holes 34, an accommodating groove 35, a plurality of integral projections 37, and two aligned integral limiting elements 38. The retaining holes 34 are formed along an outer periphery of the plate 3. The groove 35 is formed in the first side surface 30, and extends from the front end 31 of the plate 3 to the rear end 33 of the plate 3. The limiting elements 38 extend respectively from the left and right sides (32L, 32R) toward each other, and define an open front end (35F) of the groove 35 between the plate 3 and the limiting elements 38. The card 20 is disposed at a retracted position shown in FIGS. 3 and 7, where a front end 21 of the card 20 extends from the open front end (35F) of the groove 35 and where a space 39 is present between, a rear end 22 of the card 20 and a closed rear end (35R) of the groove 35. As illustrated, the rear end 22 is spaced apart from the rear end (35R) at only a small distance. The plate 3 is generally rectangular, and has two long sides, two short sides, and a curved notch 115 formed in one of the short sides, thereby facilitating insertion of the card 20 into the groove 35. On two sides of the curved notch 315, two inclined guiding faces 313 are formed on the first side surface 30 of the plate 3, thereby further facilitating the insertion of the card 20 into the groove 35.

The card-ejecting device 5 includes a metal movable member 51, which is formed with an integral positioning element 511 that is shaped as a plate and that is parallel to the plate 3. The positioning element 511 is formed with a pressed abutment portion 513 that extends into the groove 35 and that is adapted to abut against the rear end 22 of the card 20. The movable member 51 is formed with an integral sliding element 512 which has an inverted L-shaped cross-section and which is disposed slidably within a slide slot 321 that is formed in the right side (32R) of the plate 3 and that extends along the length of the plate 3. As such, when the card 20 is pressed inwardly in the groove 35 in a longitudinal direction of the plate 3, the movable member 51 moves synchronously with the card 20. When the card 20 is located at the retracted position shown in FIGS. 3 and 7, the movable member 51 is disposed at a first position.

The cover plate 7 is made of a metal, and includes a front end 71, an opening 72, a rear end 73, an integral pressing arm 75, two integral side walls 76, and a plurality of clamping sheets 77 that engage respectively the retaining holes 34 in the base plate 3 and that are straight before assembly of the connector, as shown in FIG. 1. During assembly, the clamping sheets 77 are bent into an L-shape, thereby clamping the base plate 3 between the cover plate 7 and the clamping sheets 77. As such, the base plate 3 and the cover plate 7 are interconnected fixedly, thereby preventing removal of the movable member 51 from the slide slot 321 in the base plate 3, as shown in FIG. 2. The cover plate 7 has a front side, which is formed with a trapezoid notch 711 at a middle portion thereof that is adjacent to the open front end (35F) of the groove 35 and that is aligned with the curved notch 315 in the base plate 3, thereby further facilitating the insertion of the card 20 into the groove 35.

The movable member 51 is formed with a pair of generally straight integral first and second resilient arms 515, 517, which extend respectively from the positioning element 511 and the sliding element 512. The card-ejecting device 5 further includes a coiled tension spring 53, a link rod 55, and a guide slot 57. The spring 53 is disposed between the movable member 51 and the base plate 3 for biasing the movable member 51 to move forward on the base plate 3. The link rod 55 is disposed between the first and second resilient arms 515, 517, and has a front end that is connected pivotally to the movable member 51, and a rear end with an integral sliding tongue 551 (see FIG. 4) that extends perpendicularly therefrom.

Figure 4:
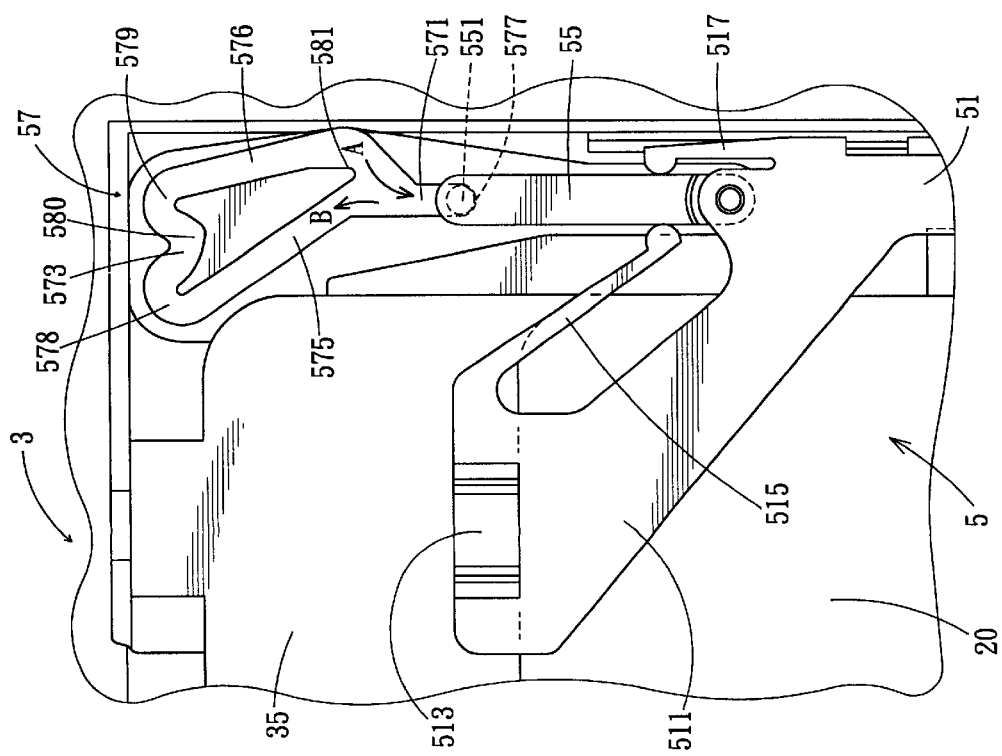
FIG. 4 is a schematic fragmentary view of the preferred embodiment, illustrating how the card is disposed at an extended position.

Referring to FIG. 4, the guide slot 57 is formed in the first side surface 30 of the base plate 3 for receiving the tongue 551 of the link rod 55 slidably therein, and has an annular slot portion and a longitudinal front slot portion 571. The annular slot portion includes a generally V-shaped rear slot portion 573, and a pair of generally straight left and right slot portions 575, 576. The longitudinal front slot portion 571 extends forward from a front end portion of the left slot portion 575, and has a closed front end 577. The left slot portion 575 extends rearward and leftward from a rear end of the longitudinal front slot portion 571. The generally V-shaped rear slot portion 573 extends rightward from a rear end of the left slot portion 575, and has a left end 578, a right end 579 that is generally in line with the longitudinal front slot portion 571, and a curved middle portion 580 that is located midway between and in front of the left and right ends 578, 579. The right slot portion 576 extends forwardly and rightward from the right end 579 of the rear slot portion 573 to the rear end of the longitudinal front slot portion 571.

The guiding action of the guide slot 57 and the biasing actions of the spring 53 and the first resilient arm 515 are described in the succeeding paragraphs.

Figure 9:
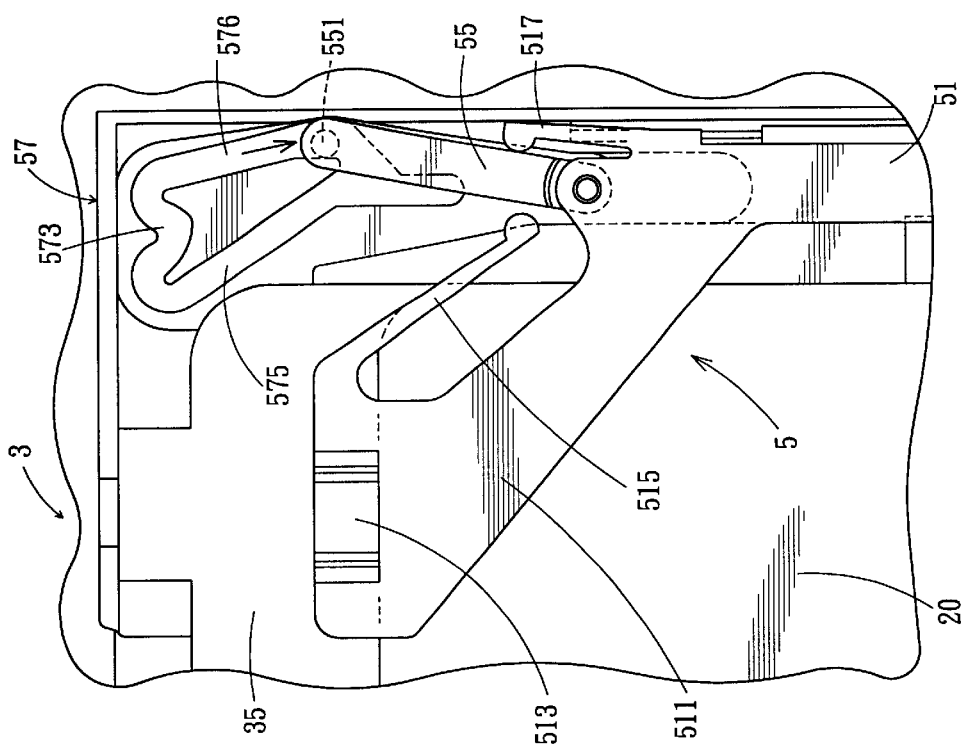
FIG. 9 is a schematic fragmentary view of the preferred embodiment, illustrating how the tongue is biased, upon release of the card, from the position shown in FIG. 8 to a right slot portion of the guide slot.
Figure 8:
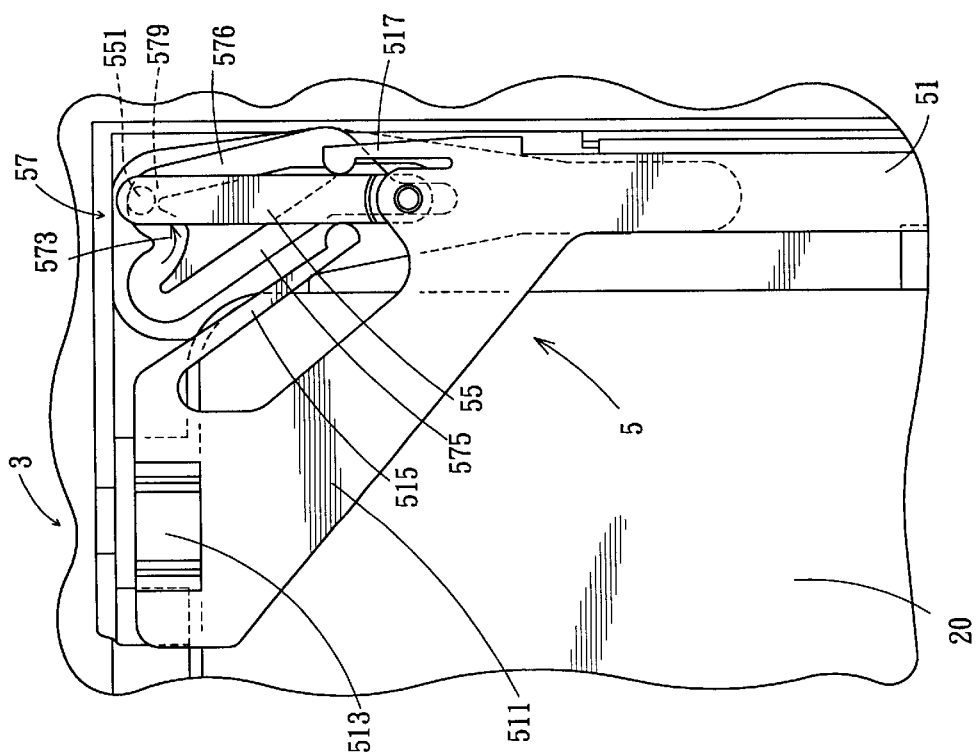
FIG. 8 is a schematic fragmentary view of the preferred embodiment, illustrating where the tongue is located in the guide slot when the rear end of the card is moved to its rear limit position in order to move the card from the retracted position to the extended position.
Figure 10:
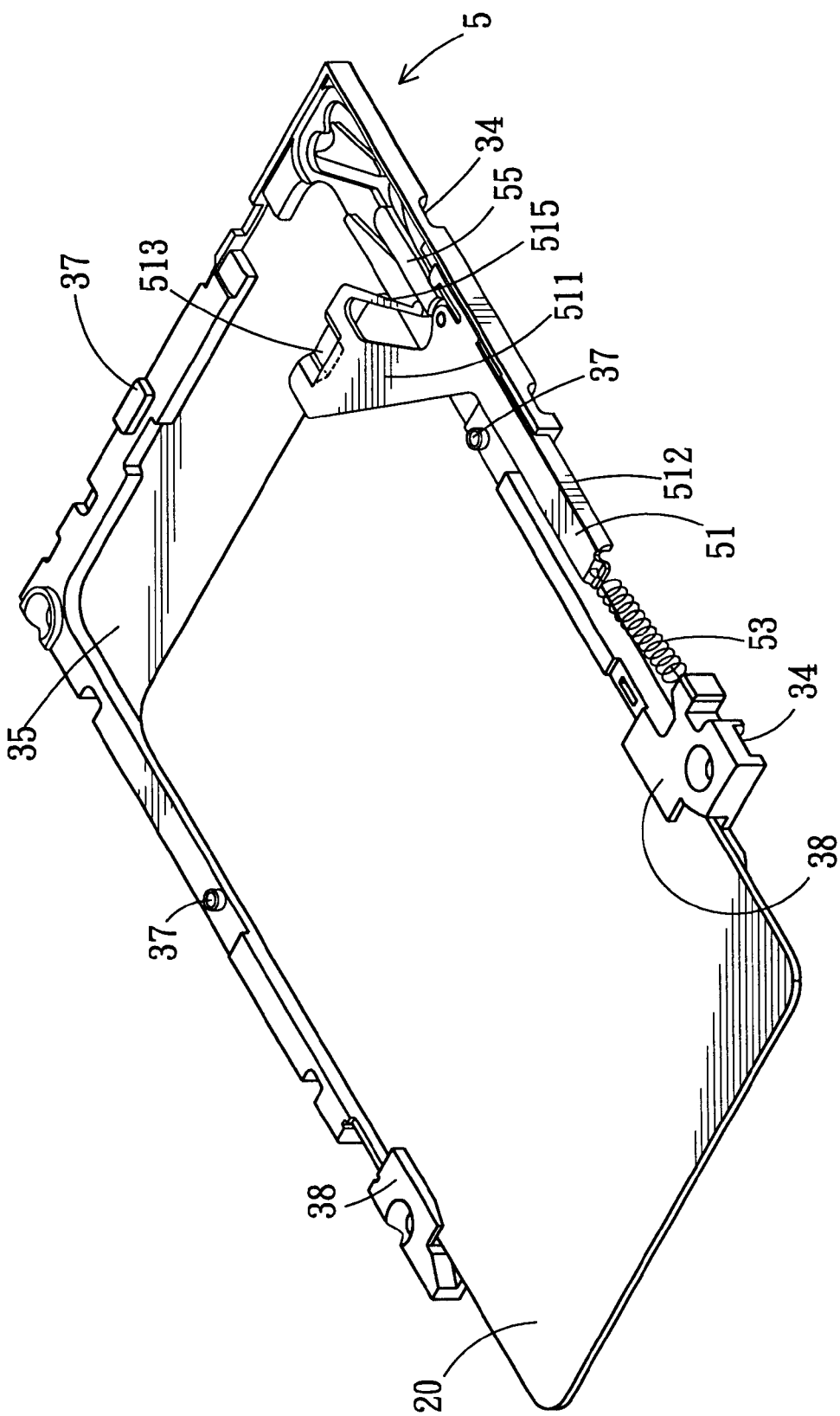
FIG. 10 is a perspective view of the preferred embodiment, illustrating how the card is disposed at the extended position.

Referring to FIGS. 3 and 7, when the movable member 51 is located at a first position, because the spring 53 is stretched so as to generate a restoration force that biases the movable member 51 forwardly, the tongue 551 is biased by the spring 53 to the curved middle portion 580. In this situation, the first resilient arm 515 is pressed by the link rod 55 to flex relative to the positioning element 511, and thus generates a restoration force that biases the tongue 551 to the right. When it is desired to eject the card 20, the front end 21 of the card 20 is pressed inwardly until the rear end 22 of the card 20 arrives at the rear end (35R) of the groove 35, i.e. a rear limit position of the card 20, thereby moving the tongue 551 to the right end 579 of the V-shaped rear slot portion 573 with the assistance of the flexed first resilient arm 515, as shown in FIG. 8. Thereafter, the card 20 is released so that the tongue 551 is pulled by the spring 53 to the right slot portion 576, as shown in FIG. 9, and subsequently to the closed front end 577 (see FIG. 4) of the longitudinal front slot portion 571, as shown in FIG. 4, in a direction shown by an arrowhead (A) in FIG. 4 by virtue of the biasing forces of the first resilient arm 515 and the spring 53. When the tongue 551 moves to the position shown in FIG. 4, the movable member 51 moves to a second position so that the card 20 is moved by the abutment portion 513 of the positioning element 511 to an extended position shown in FIG. 10, where the first and second resilient arms 515, 517 abut respectively against two opposite sides of the link rod 55 with no pressure being applied thereby to the link rod 55. As such, the link rod 55 extends toward the junction between the longitudinal front slot portion 571 and the left slot portion 575. When the card 20 is located at the extended position shown in FIG. 10, it can be taken easily out from the connector.

Figure 5:
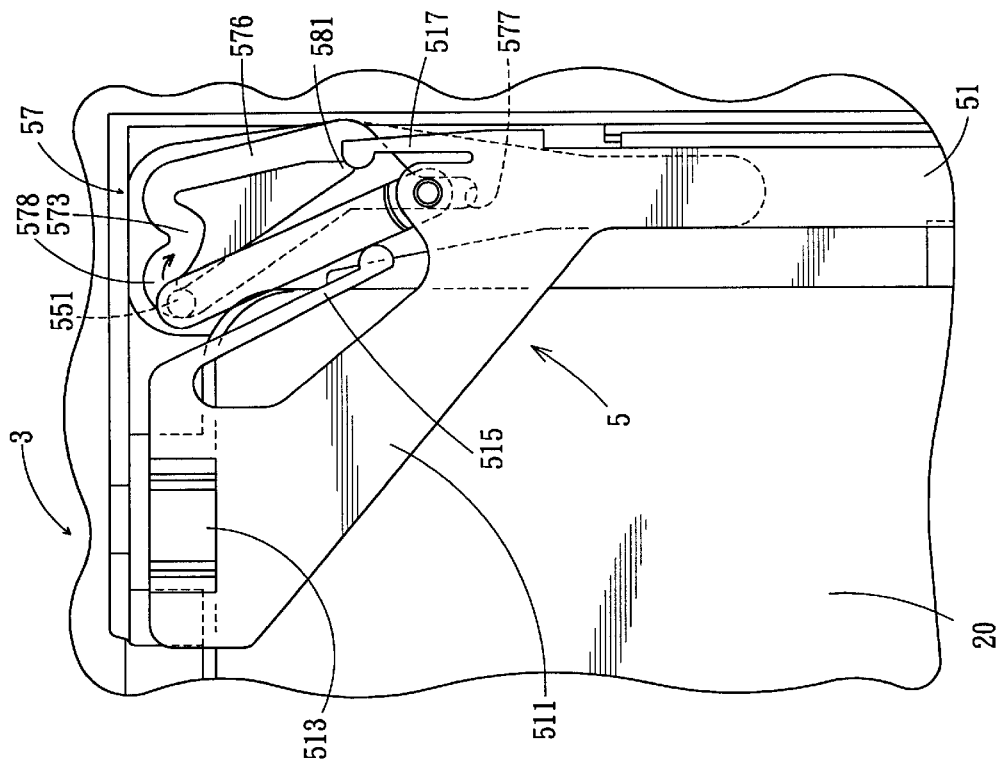
FIG. 5 is a schematic fragmentary view of the preferred embodiment, illustrating how a sliding tongue is moved in a guide slot when the card is pressed inwardly within an accommodating groove in order to move the card from the extended position to the retracted position.

When it is desired to move the card 20 to the retracted position, the card 20 is inserted into the groove 35 until the rear end 22 of the card 20 contacts the abutment portion 513 of the positioning element 511. That is to say, the card 20 is placed at the extended position. Then, the card 20 is pressed inwardly from the extended position shown in FIG. 10 so as to move the tongue 551 into the left slot portion 575 in a direction shown by an arrowhead (B) in FIG. 4 by virtue of the guidance of the first and second resilient arms 515, 517. When the tongue 551 moves to the rear end of the left slot portion 575, as shown in FIG. 5, the first resilient arm 515 is pressed by the link rod 55 to flex relative to the positioning element 511 so as to generate a restoration force that biases the link rod 55 to rotate clockwise, thereby moving the tongue 551 to the left end 578 of the V-shaped rear slot portion 571, as shown in FIG. 6, in which the rear end 22 of the card 20 reaches the rear end (35R) of the groove 35, i.e. the rear limit position of the card 20, thereby preventing further rearward movement of the card 20 on the base plate 3. Subsequently, the card 20 is released so that the tongue 551 is moved by the spring 53 and the flexed first resilient arm 515 to the curved middle portion 580 of the V-shaped rear slot portion 573, as shown in FIG. 7.

As described above, in order to move the card 20 from one of the extended and retracted positions to the other one, the steps needed to be performed include only pressing the card 20 to its rear limit position and subsequently releasing the same. Accordingly, the operation of moving the card 20 between the retracted and extended positions can be accomplished easily by means of the connector of this invention.

The connector of this invention can also be applied to connection with a thicker block or case, such as a TV remote controller. Under this condition, the depth of the groove 35 has to be increased.

With this invention thus explained, it is apparent that numerous modifications and variations can be made without departing the scope and spirit of this invention. It is therefore intended that this invention be limited only as indicated by the appended claims.

What is claimed is:

1. A card connector adapted for insertion of a card therein, the card having a front end and a rear end, said connector comprising:

an elongated base plate having a first side surface, a front end, a rear end, a left side, a right side, and an accommodating groove that is formed in said first side surface of said base plate and that extends from said front end of said base plate to said rear end of said base plate, said groove having an open front end and a closed rear end and being adapted to receive the card therein in such a manner that the card is disposed at a retracted position, where the front end of the card extends from said open front end of said groove and where a space is present between the rear end of the card and said closed rear end of said groove;

a card-ejecting device adapted to push the card outwardly relative to said groove to an extended portion in a longitudinal direction of said base plate when the front end of the card is pressed inwardly within said groove to move the rear end of the card to said closed rear end of said groove, and is subsequently released; and a retainer for retaining said card-ejecting device on said base plate;

wherein said card-ejecting device includes:
  a slide slot formed in said right side of said base plate and extending along length of said base plate;
  a movable member, which is formed with an integral positioning element that is adapted to abut against the rear end of the card so as to move said movable member and the card synchronously when the card is pressed inwardly relative to said base plate, said movable member being retained at a first position, where the card is disposed at the retracted position, and being moved, when the front end of the card is pressed inwardly relative to said base plate to move the rear end of the card to said closed rear end of said groove and is subsequently released, to a second position, where the card is disposed at the extended position where the front end of the card can be pressed inwardly once again relative to said base plate to move the rear end of the card to said closed rear end of said groove, and subsequently released, thereby biasing the card to the retracted position by means of said card-ejecting device, said movable member being disposed slidably within said slide slot and being slidable relative to said base plate in the longitudinal direction of said base plate, said movable member being formed with an integral first resilient arm;
  a spring disposed between said movable member and said base plate for biasing said movable member to move forward on said base plate;
  a link rod having a front end that is connected pivotally to said movable member, and a rear end with an integral tongue that extends perpendicularly therefrom, said first resilient arm of said movable member pressing against said link rod, thereby biasing said link rod to rotate in a predetermined direction; and
  a guide slot formed in said first side surface of said base plate for receiving said tongue of said link rod slidably therein, said guide slot having an annular slot portion and a longitudinal front slot portion that extends forward from a portion of said annular slot portion and that has a rear end, and a closed front end, said tongue of said link rod being biased by said spring to said front end of said longitudinal front slot portion when said movable member is located at said second position, said annular slot portion having
    a generally straight left slot portion extending rearward and leftward from said rear end of said longitudinal front slot portion and having a rear end,
    a generally V-shaped rear slot portion extending rightward from said rear end of said left slot portion and having a left end, a right end, and a curved middle portion that is located midway between and in front of said left and right ends, said tongue of said link rod being disposed at said curved middle portion when said movable member is located at said first position, and
    a generally straight right slot portion extending forwardly and rightward from said right end of said rear slot portion to said rear end of said longitudinal front slot portion, said tongue being movable from said curved middle portion of said V-shaped rear slot portion to said right end of said V-shaped rear slot portion by pressing inward the front end of the card so as to move the rear end of the card to said closed rear end of said groove, after which said tongue is biased, upon release of the card, by said spring and said first resilient arm to said front end of said longitudinal front slot portion via said right slot portion, said tongue being movable from said longitudinal front slot portion to said left end of said V-shaped rear slot portion via said left slot portion by pressing inward the front end of the card so as to move the rear end of the card to said closed rear end of said groove, after which said tongue is biased, upon release of the card, by said spring and said first resilient arm to said curved middle portion of said V-shaped rear slot portion.

2. The card connector as claimed in claim 1, wherein said movable member is made of metal, said positioning element being shaped as a plate, which is parallel to said base plate and which is formed with a pressed abutment portion that extends into said groove and that is adapted to abut against the rear end of the card.

3. The card connector as claimed in claim 2, wherein said movable member is formed with an integral second resilient arm, said first and second resilient arms abutting against two opposite sides of said link rod with no pressure being applied by said first and second resilient arms to said link rod when said movable member is disposed at said second position, in such a manner to direct said link rod toward a junction between said left slot portion and said longitudinal front slot portion, thereby guiding said tongue to move into said left slot portion when said movable member is moved from said second position to said first position.

4. The card connector as claimed in claim 3, wherein said right end of said V-shaped rear slot portion is generally in line with said longitudinal front slot portion, whereby, when said tongue moves along said left slot portion, said first resilient arm flexes relative to said positioning element so as to generate a restoration force, which biases said tongue to move from said left end of said V-shaped rear slot portion to said curved middle portion of said V-shaped rear slot portion, and subsequently from said curved middle portion of said V-shaped rear slot portion to said right end of said V-shaped rear slot portion.

5. The card connector as claimed in claim 1, wherein said retainer is shaped as a cover plate, which is mounted fixedly on said base plate and which is parallel to said base plate, thereby preventing removal of said movable member from said slide slot in said base plate.

6. The card connector as claimed in claim 5, wherein said cover plate has a front side, which is formed with a trapezoid notch at a middle portion thereof that is adjacent to said open front end of said groove and that is adapted to facilitate insertion of the card into said groove.

7. The card connector as claimed in claim 6, wherein said base plate is generally rectangular, and has two long sides and two short sides, said front end of said base plate having a curved notch formed in one of said short sides, which is aligned with said trapezoid notch in said cover plate, thereby further facilitating the insertion of the card into said groove.

8. The card connector as claimed in claim 7, wherein said first side surface of said base plate has two inclined guiding faces, which are formed on said one of said short sides and which are located on two sides of said curved notch, thereby further facilitating the insertion of the card into said groove.

9. The card connector as claimed in claim 5, wherein said base plate is formed with a plurality of retaining holes along an outer periphery thereof, said cover plate being formed integrally with a plurality of L-shaped clamping sheets that engage respectively said retaining holes so as to clamp said base plate and said board between said cover plate and said clamping sheets, thereby interconnecting said base plate and said cover plate fixedly.

10. The card connector as claimed in claim 1, wherein said base plate is formed with two aligned integral limiting elements, which extend respectively from said left and right sides toward each other and which define said open front end of said groove between said base plate and said limiting elements.

* * * * *